United States Patent
Shen

(10) Patent No.: US 11,221,247 B2
(45) Date of Patent: *Jan. 11, 2022

(54) COMMUNICATING WITH TWO OR MORE HOSTS

(71) Applicant: Micro Motion, Inc., Boulder, CO (US)

(72) Inventor: Kai Shen, Nanjing (CN)

(73) Assignee: Micro Motion, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/077,944

(22) PCT Filed: Feb. 26, 2016

(86) PCT No.: PCT/CN2016/074630
§ 371 (c)(1),
(2) Date: Aug. 14, 2018

(87) PCT Pub. No.: WO2017/143580
PCT Pub. Date: Aug. 31, 2017

(65) Prior Publication Data
US 2019/0170555 A1 Jun. 6, 2019

(51) Int. Cl.
*G01F 1/84* (2006.01)
*H04L 12/707* (2013.01)
*H04L 29/08* (2006.01)

(52) U.S. Cl.
CPC .......... *G01F 1/8436* (2013.01); *H04L 45/24* (2013.01); *H04L 67/12* (2013.01)

(58) Field of Classification Search
CPC ........ G01F 1/8436; H04L 45/24; H04L 67/12
See application file for complete search history.

(56) References Cited

U.S. PATENT DOCUMENTS

| | | | |
|---|---|---|---|
| 5,661,232 A | 8/1997 | Brainerd et al. | |
| 6,032,154 A | 2/2000 | Coleman et al. | |
| 2003/0128134 A1* | 7/2003 | Fierro | H04Q 9/04 340/870.02 |
| 2003/0137968 A1 | 7/2003 | Lareau et al. | |
| 2005/0073406 A1 | 4/2005 | Easley et al. | |
| 2005/0195775 A1* | 9/2005 | Petite | H04W 72/082 370/338 |
| 2006/0290491 A1 | 12/2006 | Wagner et al. | |
| 2007/0139218 A1* | 6/2007 | Bovankovich | G01D 4/004 340/870.02 |
| 2009/0007968 A1 | 1/2009 | Christian et al. | |
| 2010/0188257 A1* | 7/2010 | Johnson | G01D 4/004 340/870.02 |
| 2010/0299452 A1* | 11/2010 | Flammer | H04L 45/00 709/241 |

(Continued)

FOREIGN PATENT DOCUMENTS

| | | |
|---|---|---|
| CN | 102353404 | 2/2012 |
| CN | 104612236 A | 5/2015 |

(Continued)

*Primary Examiner* — Amine Benlagsir
(74) *Attorney, Agent, or Firm* — The Ollila Law Group LLC

(57) ABSTRACT

A method of communicating with two or more hosts is provided. The method includes transmitting a first communication between a first host and a meter electronics and transmitting a second communication between a second host and the meter electronics.

12 Claims, 5 Drawing Sheets

(56) References Cited

U.S. PATENT DOCUMENTS

2011/0181438 A1* 7/2011 Millstein .................. H04Q 9/00
340/870.02
2015/0088442 A1* 3/2015 Farrar ................ G01R 21/1333
702/62

FOREIGN PATENT DOCUMENTS

| ES | 2170652 A1 | 8/2002 |
|----|------------|---------|
| JP | 2000253465 A | 9/2000 |
| JP | 2002111705 A | 4/2002 |
| WO | 2008013545 | 1/2008 |
| WO | 2008024112 | 2/2008 |
| WO | 2008111983 | 9/2008 |
| WO | 2009017494 | 2/2009 |
| WO | 2009105096 | 8/2009 |
| WO | 2009148451 | 12/2009 |
| WO | 2010056244 | 5/2010 |
| WO | 2013006171 A1 | 1/2013 |
| WO | 2015048380 A1 | 4/2015 |

* cited by examiner

COMMUNICATING WITH TWO OR MORE HOSTS

TECHNICAL FIELD

The embodiments described below relate to meter electronics that communicate with a host and, more particularly, communicating with two or more hosts.

BACKGROUND

Vibrating sensors, such as for example, vibrating densitometers and Coriolis flowmeters are generally known, and are used to measure mass flow and other information related to materials flowing through a conduit in the flowmeter. Exemplary Coriolis flowmeters are disclosed in U.S. Pat. Nos. 4,109,524, 4,491,025, and Re. 31,450. These flowmeters have meter assemblies with one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode. When there is no flow through the flowmeter, a driving force applied to the conduit(s) causes all points along the conduit(s) to oscillate with identical phase or with a small "zero offset", which is a time delay measured at zero flow.

As material begins to flow through the conduit(s), Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

A meter electronics connected to the driver generates a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement.

Many systems utilize two or more meter assemblies due to various design constraints. For example, meter assemblies used in dispensing liquid natural gas (LNG) to LNG vehicles may utilize a first meter assembly to measure fuel pumped from an LNG storage tank to the LNG vehicle. A second meter assembly may be used to measure the fuel that is returned to the LNG tank. The fuel returned to the LNG tank may have a different flow rate, temperature, state, etc. Typically, a host communicates with two meter electronics in communication with the first and second meter assembly. However, two or more hosts may need to obtain information from the two meter assemblies. Accordingly, there is a need for communicating with two or more hosts.

SUMMARY

A method of communicating with two or more hosts is provided. According to an embodiment, the method comprises transmitting a first communication between a first host and a meter electronics and transmitting a second communication between a second host and the meter electronics.

A meter electronics for communicating with two or more hosts is provided. According to an embodiment, the meter electronics comprises a processor configured to communicate with a first host using a first communication and a second host using a second communication.

A system for communicating with two or more hosts is provided. According to an embodiment, the system comprises a first meter assembly and a second meter assembly and a meter electronics communicatively coupled to the first meter assembly and the second meter assembly, the meter electronics being configured to communicate with a first host using a first communication and a second host using a second communication.

ASPECTS

According to an aspect, a method of communicating with two or more hosts comprises transmitting a first communication between a first host and a meter electronics and transmitting a second communication between a second host and the meter electronics.

Preferably, the first communication is transmitted via a first communication port of the meter electronics and the second communication is transmitted via a second communication port of the meter electronics.

Preferably, the first communication and the second communication are transmitted via a communication path communicatively coupling the first host and the second host with the meter electronics.

Preferably, the first communication includes a first address associated with a first meter assembly and the second communication includes a second address associated with a second meter assembly.

Preferably, the method further comprises converting the first communication and the second communication with one or more signal converters in the meter electronics.

According to an aspect, a meter electronics (100) for communicating with two or more hosts comprises a processor (110) configured to communicate with a first host (50a) using a first communication (400a) and a second host (50b) using a second communication (400b).

Preferably, the processor (110) is further configured communicate with the first host (50a) via a first communication port (140a) of the meter electronics (100) and communicate with the second host (50b) via a second communication port (140b) of the meter electronics (100).

Preferably, the processor (110) is further configured to communicate with the first host (50a) and the second host (50b) via a communication path (26) communicatively coupling the first host (50a) and the second host (50b) with the meter electronics (100).

Preferably, the first communication (400a) includes a first address (410a) associated with a first meter assembly (10a) and the second communication (400b) includes a second address (410b) associated with a second meter assembly (10b).

Preferably, the meter electronics (100) further comprises one or more signal converters (170) configured to convert the first communication (400a) and the second communication (400b).

According to an aspect, a system (5) for communicating with two or more hosts comprises a first meter assembly (10a) and a second meter assembly (10b) and a meter electronics (100) communicatively coupled to the first meter assembly (10a) and the second meter assembly (10b), the meter electronics (100) being configured to communicate with a first host (50a) using a first communication (400a) and a second host (50b) using a second communication (400b).

Preferably, the meter electronics (100) is further configured communicate with the first host (50a) via a first communication port (140a) of the meter electronics (100) and communicate with the second host (50b) via a second communication port (140b) of the meter electronics (100).

Preferably, the meter electronics (100) is further configured to communicate with the first host (50a) and the second host (50b) via a communication path (26) communicatively coupling the first host (50a) and the second host (50b) with the meter electronics (100).

Preferably, the first communication (400a) includes a first address (410a) associated with the first meter assembly (10a) and the second communication (400b) includes a second address (410b) associated with the second meter assembly (10b).

Preferably, the meter electronics (100) further comprises one or more signal converters (170) configured to convert the first communication (400a) and the second communication (400b).

BRIEF DESCRIPTION OF THE DRAWINGS

The same reference number represents the same element on all drawings. It should be understood that the drawings are not necessarily to scale.

DETAILED DESCRIPTION

FIGS. 1-5 and the following description depict specific examples to teach those skilled in the art how to make and use the best mode of communicating with two or more hosts. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of communicating with two or more hosts. As a result, the embodiments described below are not limited to the specific examples described below, but only by the claims and their equivalents.

Communicating with two or more hosts may include transmitting a first communication between a first host and a meter electronics. A second communication may be transmitted between the same meter electronics and a second host. In embodiments, the first and second communication may respectively be transmitted via first and second communication port of the meter electronics. If the first and second communication are packet-based communications, the first and second communication can include addresses associated with a first and second meter assembly communicatively coupled with the meter electronics. Accordingly, the first host can obtain data from the first meter assembly and the second host can obtain data from the second meter assembly through the same meter electronics. Other benefits, such as reduced costs, or the like, may also be realized.

Vibratory Sensor System

Figure 1:
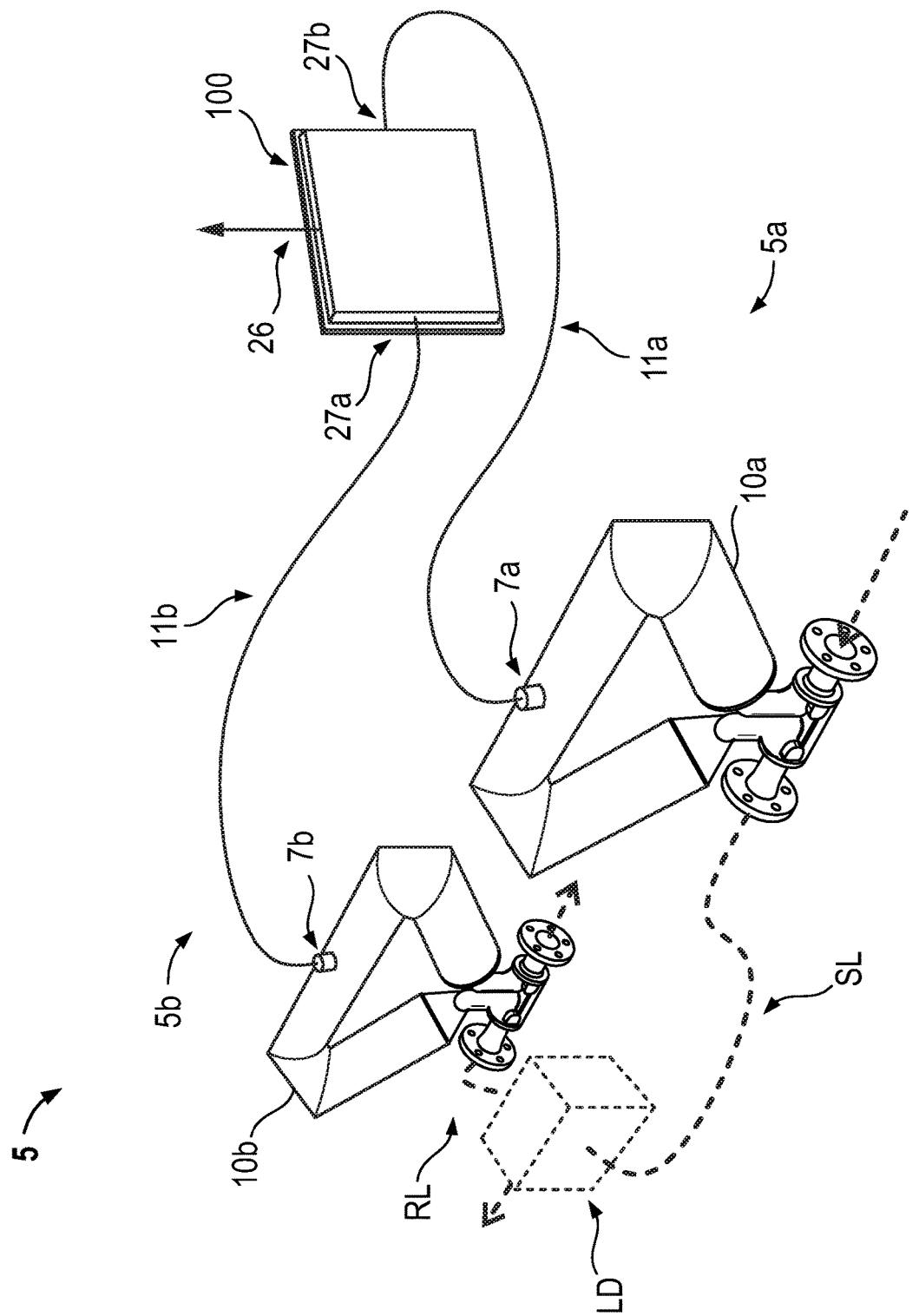
FIG. 1 shows a system 5 that communicates with two or more hosts.

FIG. 1 shows a system 5 that communicates with two or more hosts. As shown in FIG. 1, the system 5 is a dual vibratory sensor system that includes a first vibratory sensor 5a and a second vibratory sensor 5b. The first and second vibratory sensor 5a, 5b are respectively comprised of the meter electronics 100 and the first and second meter assembly 10a, 10b.

The meter electronics 100 is communicatively coupled to the first and second meter assembly 10a, 10b via a first and second set of leads 11a, 11b. The first and second set of leads 11a, 11b are coupled (e.g., attached, affixed, etc.) to a first and second communication port 27a, 27b on the meter electronics 100. The first and second set of leads 11a, 11b are also coupled to the first and second meter assembly 10a, 10b via a first and second communication port 7a, 7b on the first and second meter assembly 10a, 10b. The meter electronics 100 is configured to provide information over communication path 26 to a host. The first and second meter assembly 10a, 10b are shown with a case that surrounds flow tubes. The meter electronics 100 and first and second meter assembly 10a, 10b are described in more detail in the following with reference to FIGS. 2 and 3.

Still referring to FIG. 1, the first and second vibratory sensor 5a, 5b can be used to, for example, calculate a difference in flow rate and/or total flow between a supply line SL and a return line RL. More specifically, the system 5 may be employed in a cryogenic application where fluid is supplied from a tank in liquid state and then returned to the tank in a gaseous state. In one exemplary cryogenic application, the first meter assembly 10a may be part of the supply line SL that supplies LNG to an LNG dispenser LD and the second meter assembly 10b may be part of a return line RL from the LNG dispenser LD. The total flow through the second meter assembly 10b can be subtracted from the total flow through the first meter assembly 10a to determine the total amount of LNG dispensed by the LNG dispenser LD. This exemplary application with the supply and return line SL, RL is shown with dashed lines to illustrate that the system 5 can be employed in other applications. In addition, other cryogenic fluids may be employed, such as hydrogen, or the like. As can also be appreciated, in the described and other embodiments, the calculations can be performed by the meter electronics 100, which is described in more detail in the following.

Figure 2:
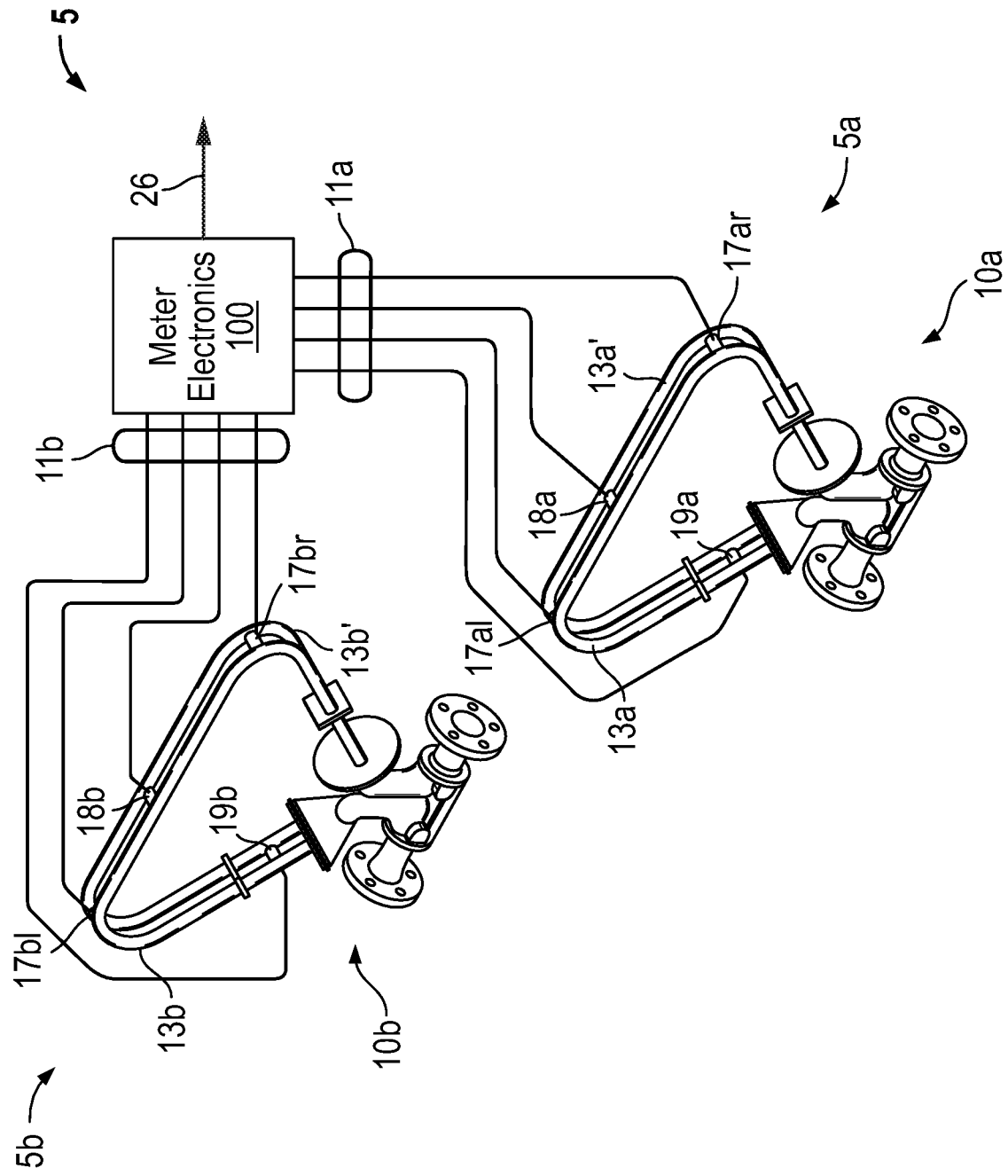
FIG. 2 shows the system 5 that communicates with two or more hosts.

FIG. 2 shows the system 5 that communicates with two or more hosts. As shown in FIG. 2, the system 5 includes the first vibratory sensor 5a and the second vibratory sensor 5b described in the foregoing with reference to FIG. 1. The cases on the meter electronics 100 and first and second meter assembly 10a, 10b are not shown for clarity. The first and second meter assembly 10a, 10b respond to mass flow rate and density of a process material. The meter electronics 100 is connected to the first and second meter assembly 10a, 10b via a first and second set of leads 11a, 11b to provide density, mass flow rate, and temperature information over the communication path 26, as well as other information. A Coriolis flow meter structure is described although it is apparent to those skilled in the art that the present invention could be practiced as a vibrating conduit densitometer, tuning fork densitometer, viscometer, or the like.

The first and second meter assembly 10a, 10b include a pair of parallel conduits 13a, 13a' and 13b, 13b', a first and second drive mechanism 18a, 18b, temperature sensor 19a, 19b, and pair of left and right pick-off sensors 17al, 17ar and 17bl, 17br. Each of the pair of conduits 13a, 13a' and 13b, 13b' bend at two symmetrical locations along the conduits 13a, 13a' and 13b, 13b' length and are essentially parallel throughout their length. The conduits 13a, 13a' and 13b, 13b' are driven by the drive mechanisms 18a, 18b in opposite directions about their respective bending axes and at what is termed the first out-of-phase bending mode of the flow meter. The drive mechanisms 18a, 18b may comprise any one of many arrangements, such as a magnet mounted to the conduits 13a', 13b' and an opposing coil mounted to the conduits 13a, 13b and through which an alternating current is passed for vibrating both conduits 13a, 13a' and 13b, 13b'. A suitable drive signal is applied by the meter electronics 100 to the drive mechanisms 18a, 18b.

The first and second vibratory sensor 5a, 5b can be initially calibrated and a flow calibration factor FCF, along with a zero offset $\Delta T_0$, can be generated. In use, the flow calibration factor FCF can be multiplied by the time delay $\Delta T$ measured by the pickoffs minus the zero offset $\Delta T_0$ to generate a mass flow rate ṁ. An example of a mass flow rate equation utilizing a flow calibration factor FCF and a zero offset $\Delta T_0$ is described by Equation (1):

$$\dot{m} = FCF(\Delta T_{measured} - \Delta T_0) \quad (1)$$

Where:
ṁ=mass flow rate
FCF=flow calibration factor
$\Delta T_{measured}$=measured time delay
$\Delta T_0$=initial zero offset The temperature sensors 19a, 19b are mounted to conduits 13a', 13b' to continuously measure the temperature of the conduits 13a', 13b'. The temperature of the conduits 13a', 13b' and hence the voltage appearing across the temperature sensors 19a, 19b for a given current is governed by the temperature of the material passing through the conduits 13a', 13b'. The temperature dependent voltages appearing across the temperature sensors 19a, 19b may be used by the meter electronics 100 to compensate for the change in elastic modulus of the conduits 13a', 13b' due to any changes in conduit temperature. In the embodiment shown, the temperature sensors 19a, 19b are resistive temperature detectors (RTD). Although the embodiments described herein employ RTD sensors, other temperature sensors may be employed in alternative embodiments, such as thermistors, thermocouples, etc.

The meter electronics 100 receives the left and right sensor signals from the left and right pick-off sensors 17al, 17ar and 17bl, 17br and the temperature signals from the temperature sensors 19a, 19b via the first and second set of leads 11a, 11b. The meter electronics 100 provides a drive signal to the drive mechanism 18a, 18b and vibrates the first and second pair of conduits 13a, 13a' and 13b, 13b'. The meter electronics 100 processes the left and right sensor signals and the temperature signals to compute the mass flow rate and the density of the material passing through the first and/or second meter assembly 10a, 10b. This information, along with other information, is applied by meter electronics 100 over communication path 26 as a signal.

As can be appreciated, although the system 5 shown in FIGS. 1 and 2 includes only two meter assemblies 10a, 10b, the system 5 may be employed in systems that include more than two meter assemblies. For example, a meter electronics may be configured to communicate with three or more meter assemblies. In such a configuration, the system 5 may be a portion of the meter electronics and two of the three or more meter assemblies.

Meter Electronics

Figure 3:
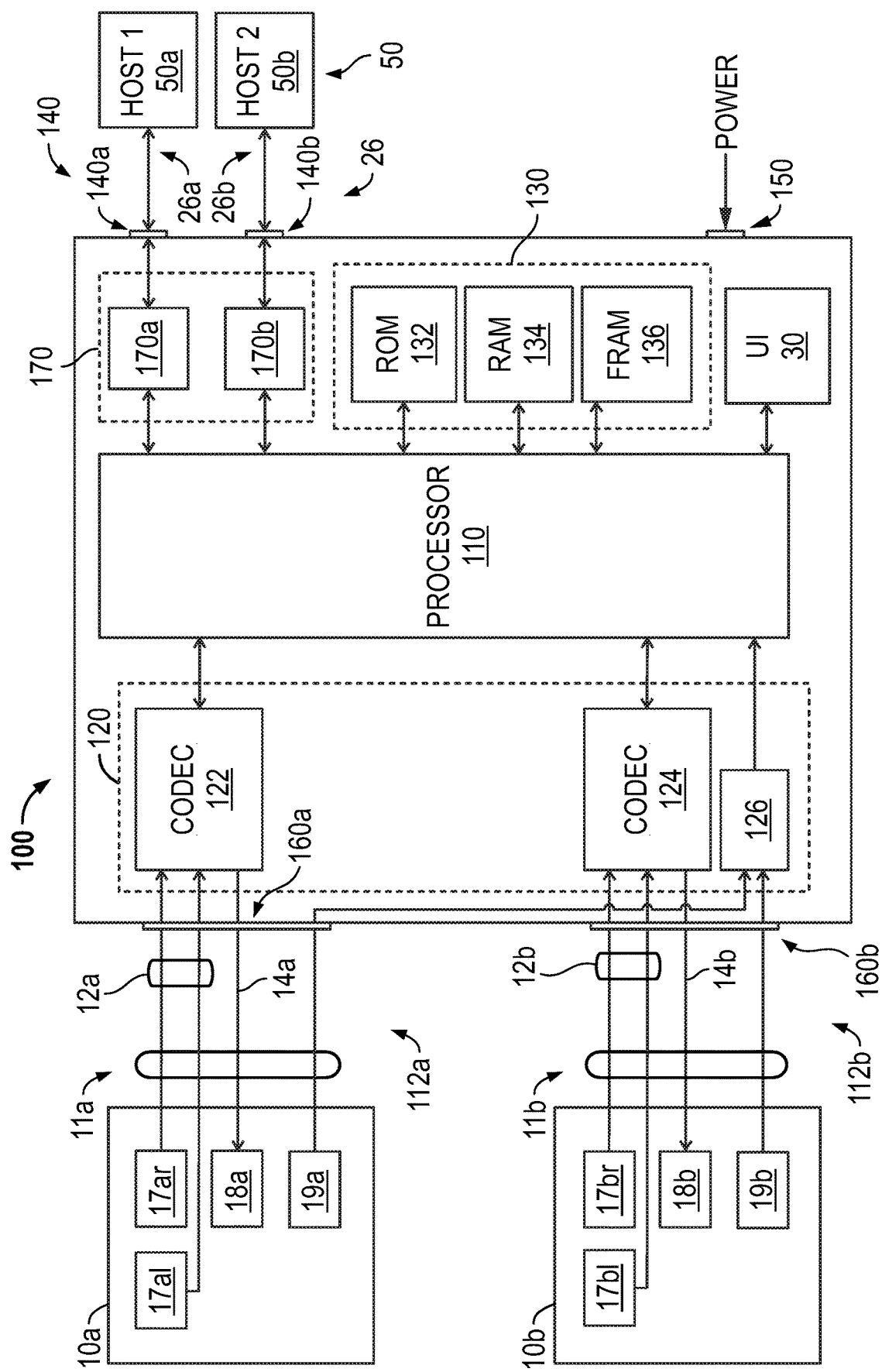
FIG. 3 shows a block diagram of the meter electronics 100 for communicating with two or more hosts.

FIG. 3 shows a block diagram of the meter electronics 100 for communicating with two or more hosts. As shown in FIG. 3, the meter electronics 100 is communicatively coupled to the first and second meter assembly 10a, 10b and two or more hosts 50. As described in the foregoing with reference to FIG. 1, the first and second meter assembly 10a, 10b include the left and right pick-off sensors 17al, 17ar and 17bl, 17br, drive mechanisms 18a, 18b, and temperature sensors 19a, 19b, which are communicatively coupled to the meter electronics 100 via the first and second set of leads 11a, 11b through a first and second communication channel 112a, 112b and a first and second I/O port 160a, 160b. Also shown is one or more signal converters 170 communicatively coupled to the processor 110 and the two or more hosts 50 via two or more communication ports 140 and a communication path 26.

The communication path 26 may be a communication bus, such as a Modbus, Fieldbus, etc. Alternatively, the communication path 26 may also be a network, such as a local area network (LAN), wide area network (WAN), etc. The communication path 26 may also be comprised of different components, such as, for example, a bus in communication with a network, or the like. In these and other embodiments, the communication path 26 is configured to carry information, such as flow rates, density, or the like, from the meter electronics 100 to the two or more hosts 50.

The two or more hosts 50 may be any suitable hosts, such as computers configured to execute programs that communicate with the meter electronics 100 and/or the first and second meter assembly 10a, 10b. For example, the two or more hosts 50 may execute a program that receives the information from the meter electronics 100 and performs calculations using the information, send commands to other components, such as, for example, flow control components, communicatively coupled to the two or more hosts 50.

The communication path 26 is shown as being comprised of a first communication path 26a and a second communication path 26b. Additional communication paths may be employed in alternative embodiments. The first and second communication path 26a, 26b may be any suitable communication paths. For example, each of the first and second communication path 26a, 26b may be a single circuit. Alternatively, the first and second communication path 26a, 26b may be protocol based such that each of the first and second communication path 26a, 26b represents packet addressing over the communication path 26. As shown in FIG. 3, the first and second communication path 26a, 26b are communicatively coupled to the two or more hosts 50.

The two or more hosts 50 is shown as being comprised of a first host 50a and a second host 50b. However, additional hosts may be employed in alternative embodiments. The first and second host 50a, 50b may be distinct personal computers although any suitable configuration may be employed in alternative embodiments. For example, the first and second host 50a, 50b may be instances on a server that respectively execute software to, for example, receive and perform operations on information provided by the first and second meter assembly 10a, 10b. The first host 50a may be any suitable host configured to communicate with the first meter assembly 10a and the second host 50b may be any suitable host configured to communicate with the second meter assembly 10*b*. As can be appreciated, the first and second host 50*a*, 50*b* respectively communicate with the first and second meter assembly 10*a*, 10*b* via the meter electronics 100.

The meter electronics 100 provides a first and second drive signal 14*a*, 14*b* via the leads 11*a*, 11 *b*. More specifically, the meter electronics 100 provides a first drive signal 14*a* to the first drive mechanism 18*a* in the first meter assembly 10*a*. The meter electronics 100 is also configured to provide a second drive signal 14*b* to the second drive mechanism 18*b* in the second meter assembly 10*b*. In addition, a first and second sensor signal 12*a*, 12*b* are respectively provided by the first and second meter assembly 10*a*, 10*b*. More specifically, in the embodiment shown, the first sensor signal 12*a* is provided by the first pair of left and right pick-off sensors 17*al*, 17*ar* in the first meter assembly 10*a*. The second sensor signal 12*b* is provided by the second pair of left and right pick-off sensors 17*bl*, 17*br* in the second meter assembly 10*b*. As can be appreciated, the first and second sensor signal 12*a*, 12*b* are respectively provided to the meter electronics 100 through the first and second communication channel 112*a*, 112*b*.

The meter electronics 100 includes a processor 110 communicatively coupled to one or more signal processors 120 and one or more memories 130. The processor 110 is also communicatively coupled to a user interface 30. The processor 110 is communicatively coupled with the two or more hosts 50 via two or more communication ports 140 over the communication path 26 and receives electrical power via an electrical power port 150. The processor 110 may be a microprocessor although any suitable processor may be employed. For example, the processor 110 may be comprised of sub-processors, such as a multi-core processor, serial communication ports, peripheral interfaces (e.g., serial peripheral interface), on-chip memory, I/O ports, and/or the like. In these and other embodiments, the processor 110 is configured to perform operations on received and processed signals, such as digitized signals.

The processor 110 may receive digitized sensor signals from the one or more signal processors 120. The processor 110 is also configured to provide information, such as a phase difference, a property of a fluid in the first or second meter assembly 10*a*, 10*b*, or the like. The processor 110 may provide the information to the two or more hosts 50 through the two or more communication ports 140. The processor 110 may also be configured to communicate with the one or more memories 130 to receive and/or store information in the one or more memories 130. For example, the processor 110 may receive calibration factors and/or meter assembly zeros (e.g., phase difference when there is zero flow) from the one or more memories 130. Each of the calibration factors and/or meter assembly zeros may respectively be associated with the first and second vibratory sensor 5*a*, 5*b* and/or the first and second meter assembly 10*a*, 10*b*. The processor 110 may use the calibration factors to process digitized sensor signals received from the one or more signal processors 120.

The one or more signal processors 120 is shown as being comprised of a first and second encoder/decoder (CODEC) 122, 124 and an analog-to-digital converter (ADC) 126. The one or more signal processors 120 may condition analog signals, digitize the conditioned analog signals, and/or provide the digitized signals. The first and second CODEC 122, 124 are configured to receive the left and right sensor signal from the left and right pick-off sensors 17*al*, 17*ar* and 17*bl*, 17*br*. The first and second CODEC 122, 124 are also configured to provide the first and second drive signal 14*a*, 14*b* to the first and second drive mechanism 18*a*, 18*b*. In alternative embodiments, more or fewer signal processors may be employed. For example, a single CODEC may be employed for the first and second sensor signal 12*a*, 12*b* and first and second drive signal 14*a*, 14*b*.

In the embodiment shown, the one or more memories 130 is comprised of a read-only memory (ROM) 132, random access memory (RAM) 134, and ferroelectric random-access memory (FRAM) 136. However, in alternative embodiments, the one or more memories 130 may be comprised of more or fewer memories. Additionally or alternatively, the one or more memories 130 may be comprised of different types of memory (e.g., volatile, non-volatile, etc.). For example, a different type of non-volatile memory, such as, for example, erasable programmable read only memory (EPROM), or the like, may be employed instead of the FRAM 136. The one or more memories 130 may be used to store information communicated over the two or more communication ports 140.

As shown, the two or more communication ports 140 include a first communication port 140*a* and a second communication port 140*b*. In alternative embodiments, more communication ports may be employed. The first communication port 140*a* is communicatively coupled to the first host 50*a* via the first communication path 26*a* and the second communication port 140*b* is communicatively coupled to the second host 50*b* via the second communication path 26*b*. The two or more communication ports 140 may be any suitable ports, such as, for example, RS-485, RS-232 ports. The two or more communication ports 140 may be comprised of the same or different communication ports. For example, the first communication port 140*a* may be the RS-485 port and the second communication port 140*b* may be the RS-232 port. As shown, the two or more communication ports 140 are communicatively coupled to the one or more signal converters 170.

The one or more signal converters 170 may be any suitable signal converter configured to convert a communication transmitted between the processor 110 and two or more hosts 50. For example, the one or more signal converters 170 may be configured to convert a universal asynchronous receiver/transmitter (UART) communication from the processor 110 to a serial communication (e.g., RS-232, RS-485, etc.) for transmission to the two or more hosts 50. Similarly, the one or more signal converters 170 may be configured to convert the serial communication into the UART communication for communications from the two or more hosts 50 to first and second meter assembly 10*a*, 10*b*. However, any appropriate signal conversion may be employed in alternative embodiments.

The one or more signal converters 170 are shown as being comprised of a first and second signal converter 170*a*, 170*b*. However, in alternative embodiments, the one or more signal converters 170 may be comprised of more signal converters. Alternatively, a signal converter may not be employed in other embodiments. As shown, the first and second signal converter 170*a*, 170*b* are respectively communicatively coupled to the first and second host 50*a*, 50*b* via the first and second communication port 140*a*, 140*b* and communication path 26*a*, 26*b*. Accordingly, the first and second signal converter 170*a*, 170*b* are respectively configured to convert a communication between the processor 110 and the first and second host 50*a*, 50*b*.

As can be appreciated, the foregoing discusses communication between the first and second meter assembly 10*a*, 10*b* and/or meter electronics 100 and the two or more hosts 50. Exemplary communications for communicating with the two or more hosts 50 is discussed in more detail in the following with reference to FIG. 4.

Communications

Figure 4:
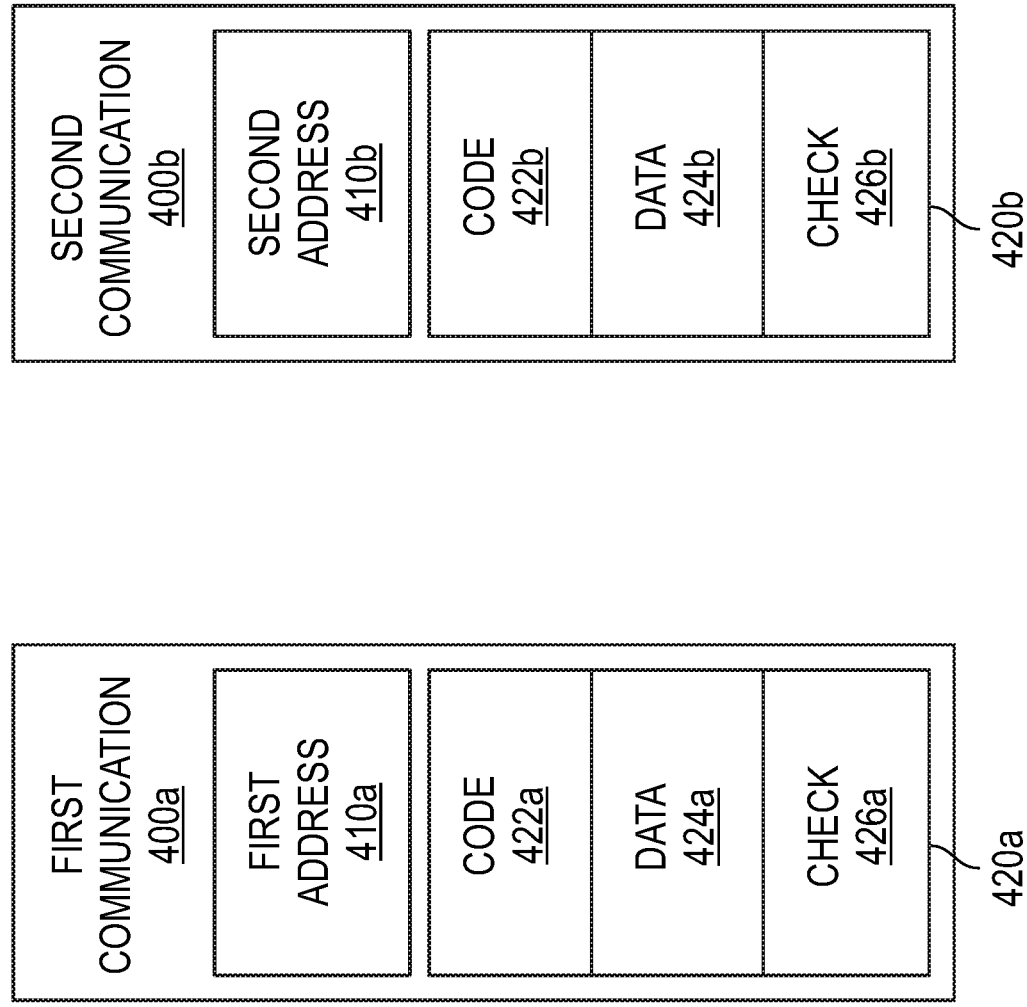
FIG. 4 shows communications 400 used to communicate with two or more hosts.

FIG. 4 shows communications 400 used to communicate with two or more hosts. As shown, the communications 400 include a first communication 400a and a second communication 400b. The first and second communication 400a, 400b respectively include a first and second address 410a, 410b and payload 420a, 420b. In the embodiment shown in FIG. 4, the first and second payload 420a, 420b respectively include a first and second code 422a, 422b, data 424a, 424b, and check 426a, 426b, which may be used to check the integrity of the first and second communication 400a, 400b.

The first and second communication 400a, 400b may be structured with headers and a protocol data unit (PDU). In the embodiment of FIG. 4, the PDU is comprised of the code 422a, 422b and data 424a, 424b. The headers are used to convey the PDU over the communication path 26 to the addressed device (e.g., the two or more hosts 50, first or second meter assembly 10a, 10b, etc.). The first and second address 410a, 410b may respectively be associated with the first and second meter assembly 10a, 10b or the first and second host 50a, 50b. In the embodiment shown, the first and second address 410a, 410b may be comprised of an integer value that can range from 1 to 247. Accordingly, there may be 248 unique devices coupled to the communication path 26. Other addresses may be used. For example, '0' may be used for a broadcast message that is received by all of the devices attached to the communication path 26.

In the PDU, the first and second code 422a, 422b may be used to instruct the meter electronics 100 to write to or read from a database. For example, the first and second code 422a, 422b may instruct the meter electronics 100 to access, read, and/or write information in a particular table, array, or other data structure, in the database. The data written to the data structure may be the first and second data 424a, 424b. The first and second data 424a, 424b may be any appropriate data. For example, first and second data 424a, 424b may also contain executable commands that can cause the addressed first or second meter assembly 10a, 10b to, for example, provide data, perform functions, such as actuating or obtaining measurements, etc. The data can also include non-executable data. For example, the first and second payload 420a, 420b may include information such as a type of data requested. The type of data requested may be a fluid property or characteristic, such as density, mass flow rate, or the like, respectively measured by the first and second meter assembly 10a, 10b, which may be transmitted over the two or more communication ports 140.

The two or more communication ports 140 may have corresponding port addresses. For example, the first and second communication port 140a, 140b may respectively be associated with a first and second port address that is stored in the processor 110 and/or one or more memories 130. The processor 110 and/or one or more memories 130 may also have a table that respectively correlates the first and second address 410a, 410b with the first and second port address. The processor 110 can therefore correctly send information between the first and second meter assembly 10a, 10b and the first and second communication port 140a, 140b. Accordingly, the first communication 400a may be correctly associated with the first meter assembly 10a and the second communication 400b may be correctly associated with the second meter assembly 10b.

Although the communications 400 is described in the foregoing as being packet based communications, any suitable communication may be employed in alternative embodiments. For example, an alternative communication may be non-packet based, such as circuit switched communication, or the like. The communications 400 may carry information in any form, such as digital, analog, mixed, etc. In the foregoing and other embodiments, the meter electronics 100, as well as alternative meter electronics, may communicate with two or more hosts using any suitable method, such as the methods described in the following with reference to FIG. 5.

Methods

Figure 5:
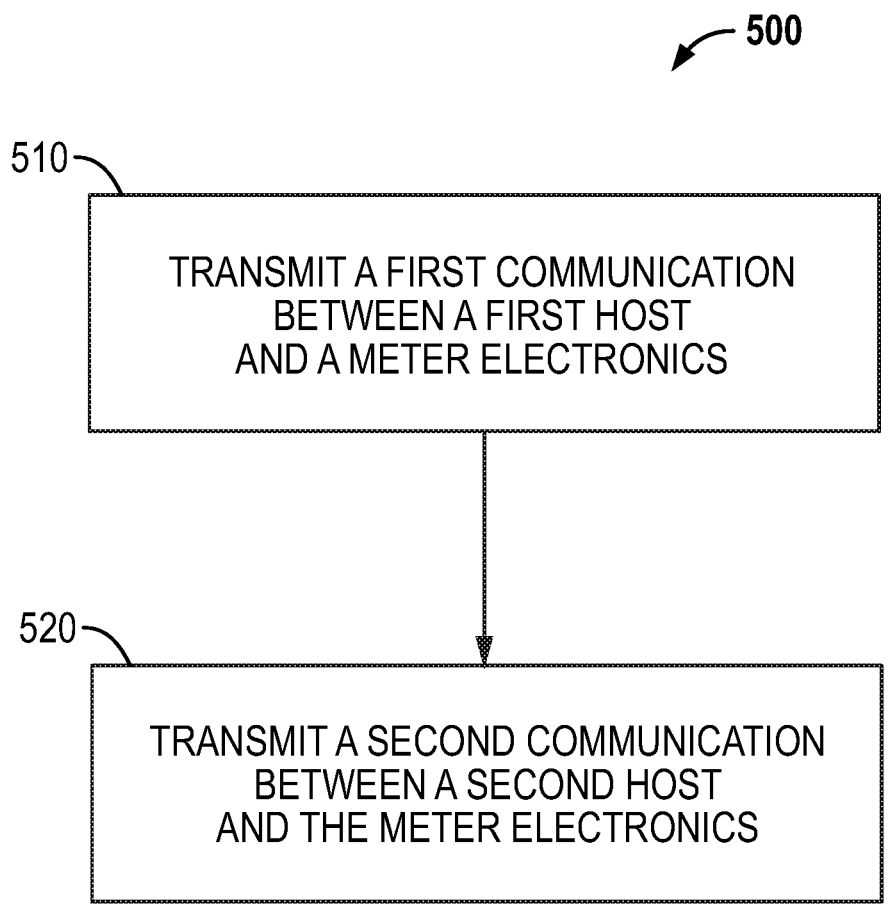
FIG. 5 shows a method 500 for communicating with two or more hosts.

FIG. 5 shows a method 500 for communicating with two or more hosts. In step 510, the method 500 transmits a first communication between a first host and a meter electronics, which may respectively be the first host 50a and meter electronics 100 described in the foregoing. The method 500 also transmits a second communication between a second host, which may be the second host 50b described in the foregoing, and the meter assembly. The first and second communication may be transmitted by a meter electronics, such as the meter electronics 100 described in the foregoing. In particular, the processor 110 may be configured to transmit the first and second communication, such as the first and second communication 400a, 400b described in the foregoing.

In step 510, the first communication may be transmitted via a first communication port. For example, the first communication may be a packet-based communication transmitted over the first communication port 140a described in the foregoing with reference to FIG. 4. In this embodiment, the first communication port 140a may be a first RS-485 port. Accordingly, the first communication may be the first communication 400a described in the foregoing, which is transmitted over the first communication path 26a.

In step 520, the second communication may be transmitted via a second communication port. For example, the second communication may be a packet-based communication transmitted over the second communication port 140b described in the foregoing with reference to FIG. 4. In this embodiment, the second communication port 140b may be a second RS-485 port. Accordingly, the second communication may be the second communication 400b described in the foregoing, which is transmitted over the second communication path 26b.

In steps 510 and 520, the first and second communication may be transmitted in any suitable manner. For example, the first and second communication may be transmitted at the same or different time. In an embodiment, the first host 50a may send a first request for data to the first communication port 140a at a different time than the second request for data sent by the second host 50b to the second communication port 140b. The first and second communication may also be in either direction. For example, the first communication may be transmitted from the first host 50a to the first communication port 140a or from the first communication port 140a to the first host 50a. The second communication may be similarly transmitted in either direction.

The foregoing provides the system 5, meter electronics 100, and method 500 for communicating with the two or more hosts 50. The system 5 and meter electronics 100 are configured to transmit and/or receive a first and second communication 400a, 400b from the first and second host 50a, 50b. The first and second communication 400a, 400b may include the first and second address 410a, 410b. Accordingly, the first host 50a may communicate with the first meter assembly 10a to, for example, obtain data from the first meter assembly 10a. Similarly, the second host 50b may communicate with the second meter assembly 10b to also obtain data from the second meter assembly 10b.

The two or most hosts 50 may therefore obtain data from the first and second meter assembly 10a, 10b through the meter electronics 100. More specifically, a single meter electronics 100 may be employed to communicate with the first and second meter assembly 10a, 10b. In an embodiment, the meter electronics 100 can include the first and second communication port 140a, 140b, which may respectively be communicatively coupled to the first and second host 50a, 50b. As a result, the first host 50a may receive data from the first meter assembly 10a and the second host 50b may receive data from the second meter assembly 10b.

In the embodiment where the system 5 is the dual vibratory sensor system that measures LNG fuel supplied to an LNG vehicle, the first host 50a may obtain, for example, a first flow rate from the first meter assembly 10a and the second host 50b may obtain a second flow rate from the second meter assembly 10b. The first and second host 50a, 50b can totalize the total LNG dispensed by the LNG dispenser LD. For example, the first and second host 50a, 50b can respectively integrate the first and second flow rate over time to obtain a first and second total LNG flow measured by the first and second meter assembly 10a, 10b. A difference in the first and second total LNG flow measured by the first and second meter assembly 10a, 10b may be the total LNG dispensed by the LNG dispenser LD to an LNG vehicle.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other systems, electronics, and methods for communicating with two or more hosts and not just to the embodiments described above and shown in the accompanying figures. Accordingly, the scope of the embodiments described above should be determined from the following claims.

I claim:

1. A method of communicating with two or more hosts, the method comprising:
   transmitting a first communication from a first host to a meter electronics to request a first fluid property measured by a first meter assembly via the meter electronics, the meter electronics being configured to receive and process a first sensor signal from the first meter assembly to compute the first fluid property measured by the first meter assembly; and
   transmitting a second communication from a second host to the meter electronics to request a second fluid property measured by a second meter assembly via the meter electronics, the meter electronics being configured to receive and process a second sensor signal from the second meter assembly to compute the second fluid property measured by the second meter assembly;
   wherein:
      the first communication includes a first address associated with the first meter assembly and the second communication includes a second address associated with the second meter assembly; and
      the meter electronics is connected to the first meter assembly with a first set of wiring leads and to the second meter assembly with a second set of wiring leads.

2. The method of claim 1, wherein the first communication is received from the first host via a first communication port of the meter electronics and the second communication is received from the second host via a second communication port of the meter electronics.

3. The method of claim 1, wherein the first communication and the second communication are transmitted via a communication path communicatively coupling the first host and the second host with the meter electronics.

4. The method of claim 1, further comprising converting the first communication and the second communication with one or more signal converters in the meter electronics.

5. A meter electronics for communicating with two or more hosts, the meter electronics comprising:
   an interface configured to receive a first sensor signal from a first meter assembly and a second sensor signal from a second meter assembly; and
   a processor communicatively coupled to the interface, the processor being configured to:
      process the first sensor signal to compute a first fluid property measured by the first meter assembly;
      process the second sensor signal to compute a second fluid property measured by the second meter assembly; and
      communicate with:
         a first host transmitting a first communication to the meter electronics to request the first fluid property measured by the first meter assembly via the meter electronics; and
         a second host transmitting a second communication to the meter electronics to request the second fluid property measured by the second meter assembly via the meter electronics; and
   wherein:
      the first communication includes a first address associated with the first meter assembly and the second communication includes a second address associated with the second meter assembly; and
      the meter electronics is connected to the first meter assembly with a first set of wiring leads and to the second meter assembly with a second set of wiring leads.

6. The meter electronics of claim 5, wherein the processor is further configured to receive the first communication from the first host via a first communication port of the meter electronics and receiving the second communication from the second host via a second communication port of the meter electronics.

7. The meter electronics of claim 5, wherein the processor is further configured to communicate with the first host and the second host via a communication path communicatively coupling the first host and the second host with the meter electronics.

8. The meter electronics of claim 5, further comprising one or more signal converters configured to convert the first communication and the second communication.

9. A system for communicating with two or more hosts, the system comprising:
- a first meter assembly and a second meter assembly; and
- a meter electronics communicatively coupled to the first meter assembly and the second meter assembly, the meter electronics being configured to:
  - receive and process a first sensor signal from the first meter assembly to compute a first fluid property measured by the first meter assembly; and
  - receive and process a second sensor signal from the second meter assembly to compute a second fluid property measured by the second meter assembly; and
  - communicate with a first host transmitting a first communication to the meter electronics to request the first fluid property measured by the first meter assembly via the meter electronics and a second host transmitting a second communication to the meter electronics to request the second fluid property measured by the second meter assembly via the meter electronics;

wherein:
- the first communication includes a first address associated with the first meter assembly and the second communication includes a second address associated with the second meter assembly; and
- the meter electronics is connected to the first meter assembly with a first set of wiring leads and to the second meter assembly with a second set of wiring leads.

10. The system of claim 9, wherein the meter electronics is further configured to receive the first communication from the first host via a first communication port of the meter electronics and receive the second communication from the second host via a second communication port of the meter electronics.

11. The system of claim 9, wherein the meter electronics is further configured to communicate with the first host and the second host via a communication path communicatively coupling the first host and the second host with the meter electronics.

12. The system of claim 9, wherein the meter electronics further comprises one or more signal converters configured to convert the first communication and the second communication.

* * * * *